US009110674B1

United States Patent
Cui et al.

(10) Patent No.: US 9,110,674 B1
(45) Date of Patent: Aug. 18, 2015

(54) SYSTEMS AND METHODS FOR DYNAMIC POWER MANAGEMENT AND PERFORMANCE ADJUSTMENT OF MEDIA PLAYING

(75) Inventors: Yao Cui, Shanghai (CN); Yi Wang, Shanghai (CN); Ke Ding, Shanghai (CN)

(73) Assignee: MARVELL INTERNATIONAL LTD., Hamilton (BM)

( * ) Notice: Subject to any disclaimer, the term of this patent is extended or adjusted under 35 U.S.C. 154(b) by 291 days.

(21) Appl. No.: 13/486,537

(22) Filed: Jun. 1, 2012

Related U.S. Application Data

(60) Provisional application No. 61/500,309, filed on Jun. 23, 2011.

(51) Int. Cl.
- *G06T 1/20* (2006.01)
- *G06F 9/38* (2006.01)
- *G06F 9/48* (2006.01)

(52) U.S. Cl.
CPC ............... *G06F 9/38* (2013.01); *G06F 9/4893* (2013.01)

(58) Field of Classification Search
None
See application file for complete search history.

(56) References Cited

U.S. PATENT DOCUMENTS

| 6,587,106 | B1 * | 7/2003 | Suzuki et al. | 345/428 |
| 7,903,116 | B1 * | 3/2011 | Klock et al. | 345/501 |
| 2008/0100613 | A1 * | 5/2008 | Woo et al. | 345/419 |
| 2008/0307245 | A1 * | 12/2008 | Cesare et al. | 713/340 |
| 2009/0313484 | A1 * | 12/2009 | Millet et al. | 713/300 |
| 2012/0084058 | A1 * | 4/2012 | Sowerby et al. | 702/186 |
| 2012/0191988 | A1 * | 7/2012 | Li et al. | 713/300 |

OTHER PUBLICATIONS

Cem Cebenoyan, Sep. 2007, Pearson Education, Inc., 5th Printing, http://http.developer.nvidia.com/GPUGems/gpugems_ch28.html.*

* cited by examiner

*Primary Examiner* — Meng An
*Assistant Examiner* — Dar-Eaum Nam

(57) ABSTRACT

System and methods are provided for dynamic performance adjustment of a media playing pipeline. For example, the media playing pipeline includes one or more components synchronized for media playing. A reference component in the media playing pipeline is selected, the reference component having a component performance level. A pipeline performance level of the media playing pipeline is determined. When the pipeline performance level is higher than a threshold, the component performance level of the reference component is adjusted to decrease the pipeline performance level. When the pipeline performance level is lower than the threshold, the component performance level of the reference component is adjusted to increase the pipeline performance level.

15 Claims, 4 Drawing Sheets

SYSTEMS AND METHODS FOR DYNAMIC POWER MANAGEMENT AND PERFORMANCE ADJUSTMENT OF MEDIA PLAYING

CROSS-REFERENCE TO RELATED APPLICATIONS

This application claims priority to and benefit from U.S. Provisional Patent Application No. 61/500,309, filed on Jun. 23, 2011, entitled "Power Saving & Media Speed up Algorithm based on Media Performance Profiler," the entirety of which is incorporated herein by reference.

FIELD

The technology described in this patent document relates generally to media processing, and more particularly to power management and performance adjustment of media playing.

BACKGROUND

Electronic devices, such as personal computers, mobile telephones, portable media players, digital cameras and camcorders, have become a significant part of people's lives today. Media playing is an important function of many electronic devices for providing consumers with entertainment. Power management and performance adjustment are critical for media playing systems with growing demands for performance, quality and functionality.

SUMMARY

In accordance with the teachings described herein, systems and methods are provided for dynamic performance adjustment of a media playing pipeline. In one embodiment, the media playing pipeline includes one or more components synchronized for media playing. A reference component in the media playing pipeline is selected, the reference component having a component performance level. A pipeline performance level of the media playing pipeline is determined. When the pipeline performance level is higher than a threshold, the component performance level of the reference component is adjusted to decrease the pipeline performance level. When the pipeline performance level is lower than the threshold, the component performance level of the reference component is adjusted to increase the pipeline performance level.

In another embodiment, a system for dynamic performance adjustment includes a media playing pipeline including one or more components synchronized for media playing and dynamic performance adjustment hardware. The dynamic performance adjustment hardware is configured to select a reference component in the media playing pipeline, the reference component having a component performance level, and determine a pipeline performance level of the media playing pipeline. The dynamic performance adjustment hardware is further configured to, when the pipeline performance level is higher than a threshold, adjust the component performance level of the reference component to decrease the pipeline performance level, and when the pipeline performance level is lower than the threshold, and adjust the component performance level of the reference component to increase the pipeline performance level.

In yet another embodiment, a non-transitory computer-readable storage medium comprises programming instructions for dynamic performance adjustment of a media playing pipeline including one or more components synchronized for media playing. The programming instructions are adapted to cause a processor to execute steps comprising, selecting a reference component in the media playing pipeline based on a predetermined criterion, the reference component having a component performance level, and determining a pipeline performance level of the media playing pipeline. The programming instructions are further adapted to cause the processor to execute steps comprising, when the pipeline performance level is higher than a threshold, adjusting the component performance level of the reference component to decrease the pipeline performance level, and when the pipeline performance level is lower than the threshold, adjusting the component performance level of the reference component to increase the pipeline performance level.

DETAILED DESCRIPTION

Figure 1:
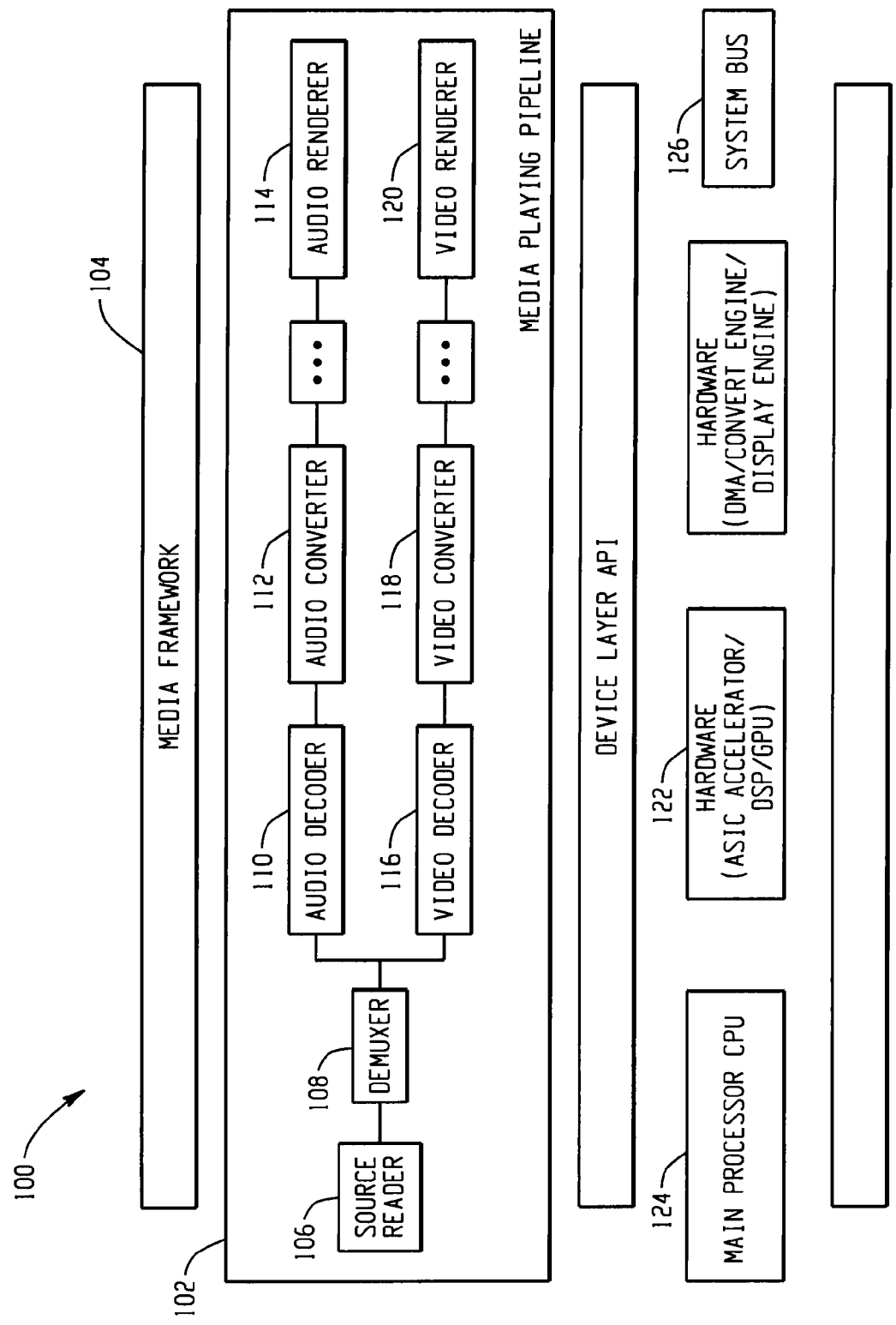
FIG. 1 illustrates an example media playing system.

FIG. 1 illustrates an example media playing system. The media playing system 100 includes a media playing pipeline 102 constructed with a media framework 104 (e.g., Gstreamer, OMX, etc.), and hardware devices (e.g., special accelerators 122, a main processor 124, and a system bus 126). The media pipeline 102 includes many different media processing components for performing different tasks of media playing, such as a source reader 106, a demuxer 108, an audio decoder 110, an audio convertor 112, an audio renderer 114, a video decoder 116, a video convertor 118, and a video renderer 120. These components are synchronized for media playing. The media playing system 100 may be implemented in various electronic systems, such as personal computers, mobile telephones, personal digital assistants, portable media players, digital cameras and camcorders.

Often, performance adjustment for the media playing system 100 are based, at least in part, on operational modes of the main processor 124 (e.g., CPU). For example, the main processor 124 usually has four operational modes, including a performance mode, a power-saving mode, an on-demand mode, and a user mode. In the performance mode, the main processor 124 often operates with a high power supply and keeps at a full performance level with a high processing speed. In the power-saving mode, the main processor 124 usually operates in a low power mode and decreases the performance level/power consumption of devices on a bus that are not in use. Further, in the on-demand mode, the main processor 124 may have a performance guard thread which determines the performance level/power consumption of the main processor 124 or other devices based on the usage of the main processor 124 or the other devices respectively. In addition, a user may determine the performance level/power consumption of the main processor 124 or other devices in the user mode.

The above-described performance adjustment methods, however, are not specially designed for media playing applications. Thus, these methods may not balance different media processing components in the media playing pipeline 102, and may not yield a good dynamic response to real-time power consumption and performance status of the system 100 during a media playing process. Without an effective dynamic performance adjustment scheme specially designed for media playing, unnecessary power consumption and performance waste may result when the media playing system 100 run at a performance level higher than needed. On the other hand, if the media playing system 100 is run at a performance level lower than needed, then the quality of the media playing may be negatively affected.

Figure 2:
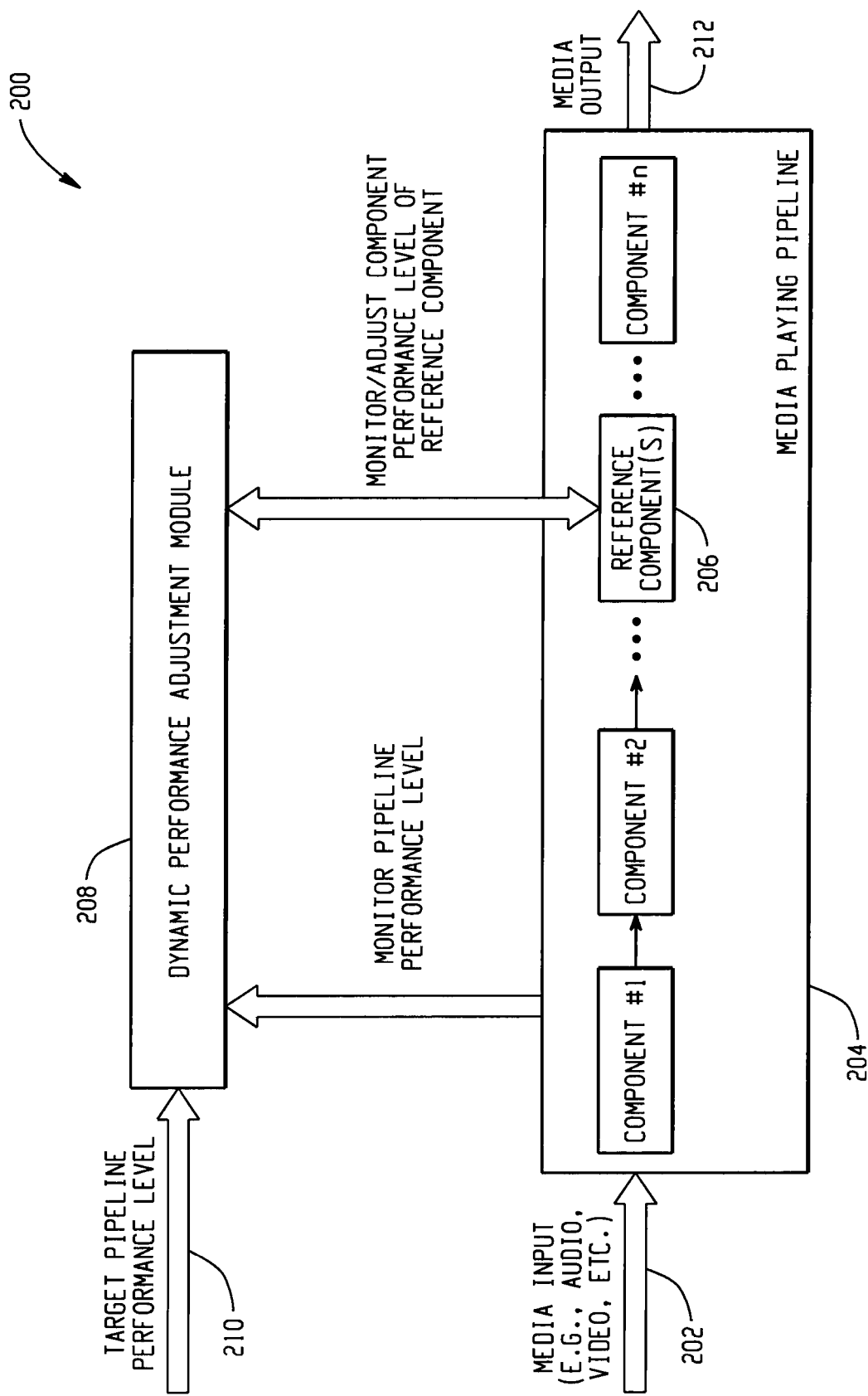
FIG. 2 illustrates an example system for dynamic performance adjustment.

FIG. 2 illustrates an example system for dynamic performance adjustment. The system 200 includes a media playing pipeline 204 and a dynamic performance adjustment module 208. The media playing pipeline 204 includes one or more media processing components, and the dynamic performance adjustment module 208 selects at least one of the media processing components in the media playing pipeline 204 as a reference component 206 based on predefined criteria. For example, a most power-consuming component or a performance-bottleneck component of the media playing pipeline 204 may be selected as the reference component 206. The dynamic performance adjustment module 208 monitors both an actual pipeline performance level of the media pipeline 204 and a component performance level of the reference component 206. If the actual pipeline performance level is not at a target pipeline performance level, the dynamic performance adjustment module 208 adjusts the component performance level of the reference component 206 in order to adjust the actual pipeline performance level.

Specifically, the reference component 206 may be selected through predefined tests (e.g., static tests for maximum performance levels and/or power consumption). For example, the reference component 206 may include a media processing component that consumes the most power among all media processing components of the media pipeline 204. In another example, the reference component 206 may include a performance-bottleneck component of the media playing pipeline 204. The performance-bottleneck component may be the same as or different from the component that consumes the most power.

The media playing pipeline 204 processes media input 202 (e.g., audio data, video data, etc.), and generates media output 212. During this process, the dynamic performance adjustment module 208 monitors both an actual pipeline performance level of the media pipeline 204 and a component performance level of the reference component 206.

When the actual pipeline performance level is determined to be higher than the target pipeline performance level, the dynamic performance adjustment module 208 adjusts the component performance level of the reference component 206 to decrease the actual pipeline performance level for power saving. On the other hand, when the actual pipeline performance level is determined to be lower than the target pipeline performance level, the dynamic performance adjustment module 208 adjusts the component performance level of the reference component 206 to increase the actual pipeline performance level for performance enhancement.

In one embodiment, the reference component 206 includes both the performance-bottleneck component and the most power-consuming component. The dynamic performance adjustment module 208 adjusts the performance level of the performance-bottleneck component for performance enhancement purposes, and adjusts the performance level of the most power-consuming component for power saving purposes.

For example, the dynamic performance adjustment module 208 may be implemented in any data processing hardware, such as a data processor, a central processing unit, an integrated circuit or other chip, an application-specific integrated circuit, a field programmable gate array, and hard-wired circuit components. In another example, the dynamic performance adjustment module 208 may be embedded in any hardware components of the media playing system 200, such as special accelerators (e.g., ASIC, DSP, GPU, or a CPU), a main processor (e.g., a CPU), a system bus, or other hardware devices (e.g., DMA, a convert engine, and a display engine). In yet another example, the dynamic performance adjustment module 208 may be implemented in any software components of the media playing system 200 for data processing.

Figure 3:
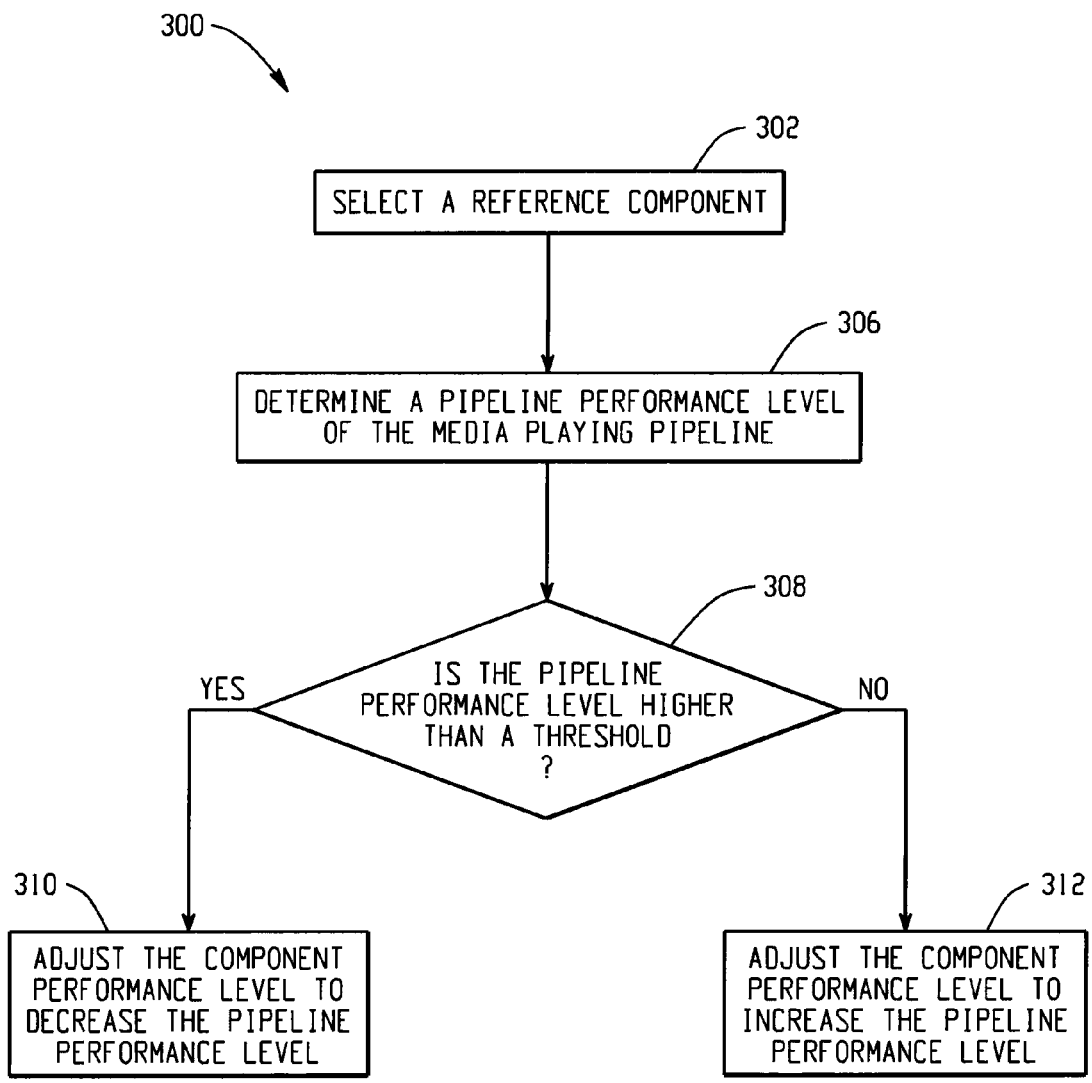
FIG. 3 illustrates an example flow diagram depicting a method for dynamic performance adjustment.

FIG. 3 illustrates an example flow diagram depicting a method for dynamic performance adjustment. At 302, a reference component in a media playing pipeline is selected with predefined tests (e.g., static tests for maximum performance levels and/or power consumption). When the media playing pipeline processes media data, a pipeline performance level of the media playing pipeline is determined at 306. For example, a component performance level of the reference component may be determined. At 308, a determination is made as to whether the pipeline performance level is higher than a threshold (e.g., a target pipeline performance level). If the pipeline performance level is higher than the threshold, then the component performance level is adjusted to decrease the pipeline performance level at 310. Otherwise, if the pipeline performance level is lower than the threshold, then the component performance level is adjusted to increase the pipeline performance level at 312.

In one embodiment, the pipeline performance level may be determined based on a late time value. When the media data arrives at a final component of the media playing pipeline (e.g., a media rendering component), a current time value is assigned to the media data right before it is rendered. Such a current time value is compared with a time stamp value which represents a time at which the media data is expected to arrive at the final component. The late time value is equal to the difference between the current time value and the time stamp value, as follows.

$$\text{Late Time Value} = \text{Current Time Value} - \text{Time Stamp Value} \qquad (1)$$

If the late time value is positive, then the media data arrives at the final component later than expected, and the pipeline performance level may need to be increased. If the late time value is negative, then the media data arrives at the final component earlier than expected, and the pipeline performance level may be reduced for power saving.

In another embodiment, the pipeline performance level may be determined based on a pipeline processing speed (e.g., frames per second). Because the components in the media playing pipeline are synchronized, a dynamic processing speed of each component should be approximately the same as the pipeline processing speed. Thus, the pipeline processing speed can be measured at any component. For example, at a video decoder in the media playing pipeline, if the number of frames processed by the video decoder during a time period is determined, then the dynamic processing speed of the video decoder is determined as follows:

$$\text{Processing Speed} = \text{Number of Processed Frames}/\text{Processing Time Period} \qquad (2)$$

The pipeline processing speed is approximately the same as the dynamic processing speed of the video decoder.

Figure 4:
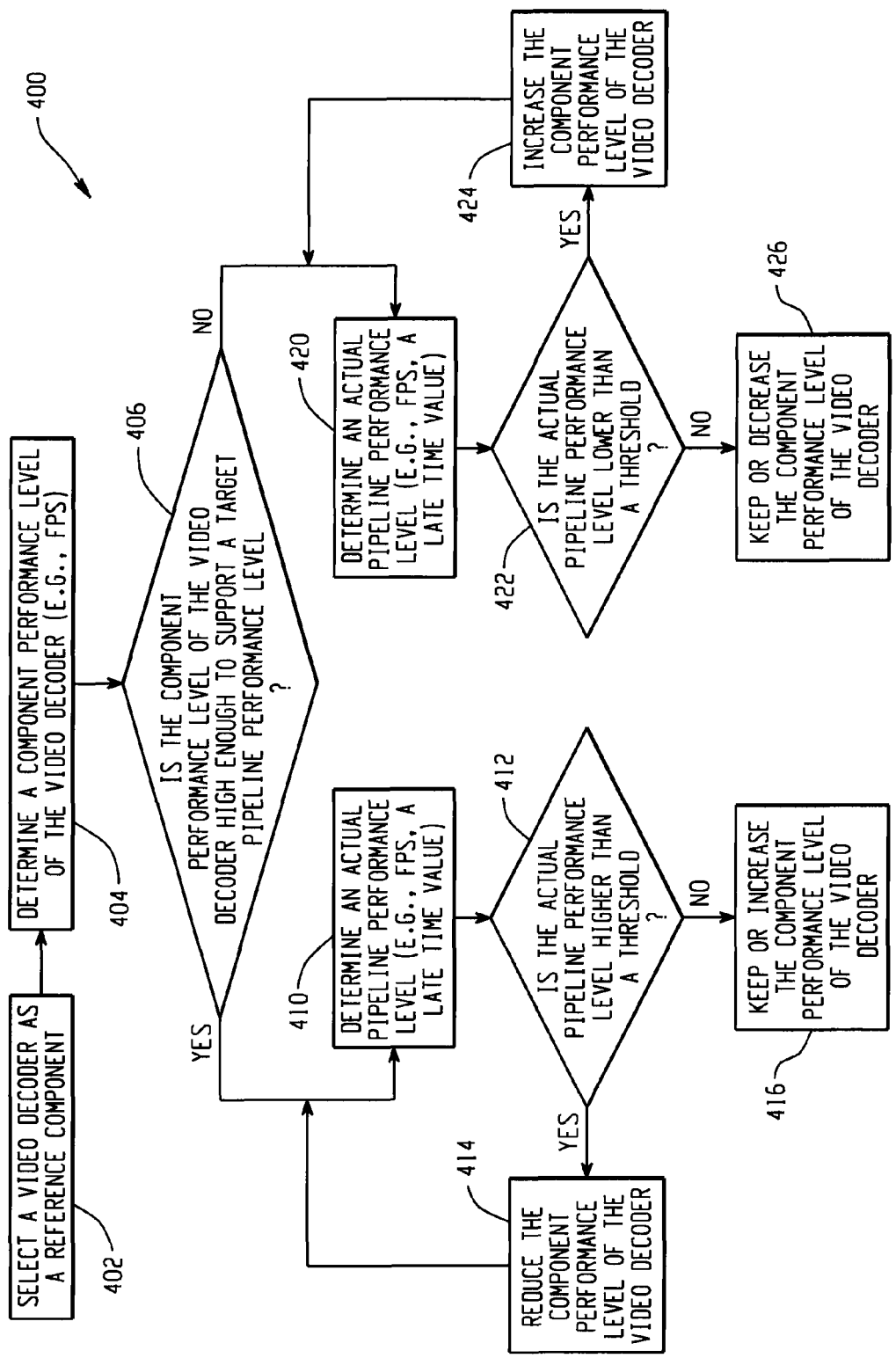
FIG. 4 illustrates another example flow diagram depicting a method for dynamic performance adjustment.

FIG. 4 illustrates another example flow diagram depicting a method for dynamic performance adjustment. At 402, a video decoder that is included in a media playing pipeline is selected as a reference component through predefined tests (e.g., static tests for maximum performance levels and/or power consumption). For example, the video decoder may be selected because it is both a performance-bottleneck component and a most power-consuming component in the media playing pipeline.

At 404, a component performance level of the video decoder (e.g., a dynamic processing speed) is determined when the media pipeline is processing media data. At 406, a determination is made as to whether the component performance level of the video decoder is high enough to support a target pipeline performance level. For example, the target pipeline speed may be set at 30 frames per second. Then, if the speed of the video decoder is 10 frames per second, the target pipeline speed cannot be achieved. On the other hand, if the speed of the video decoder is 70 frames per second, it is high enough to support the target pipeline speed.

If the component performance level of the video decoder is determined to be high enough to support the target pipeline performance level, then a power-saving path is taken. At 410, an actual pipeline performance level of the media playing pipeline is determined, e.g., a pipeline processing speed or a late time value. At 412, a determination is made as to whether the actual pipeline performance level is higher than a threshold (e.g., the target pipeline performance level). If the actual pipeline performance level is higher than the threshold, then the component performance level of the video decoder (e.g., frequency, dynamic processing speed) is reduced to decrease the actual pipeline performance level so that power consumption can be reduced at 414. For example, the dynamic processing speed of the video decoder may be reduced gradually until the actual pipeline speed is equal to or slightly higher than the target pipeline speed. If the actual pipeline performance level is not higher than the threshold, then the component performance level of the video decoder (e.g., frequency, dynamic processing speed) is kept unchanged or increased at 416.

If the component performance level of the video decoder is not high enough to support the target pipeline performance level, then a performance-enhancement path is taken. At 420, an actual pipeline performance level of the media playing pipeline is determined. At 422, a determination is made as to whether the actual pipeline performance level is lower than a threshold (e.g., the target pipeline performance level). If the actual pipeline performance level is lower than the threshold, then the component performance level of the video decoder (e.g., frequency, dynamic processing speed) is increased to raise the actual pipeline performance level at 424. For example, the processing speed of the video decoder may be increased to a large value (e.g., a maximum value) to ensure the actual pipeline performance level can be raised to be higher than or equal to the target pipeline performance level. In another example, the video decoder may increase its processing speed by skipping some non-significant frames or decreasing the value of a quantization parameter (QP). If the actual pipeline performance level is no lower than the threshold, then the component performance level of the video decoder (e.g., frequency, dynamic processing speed) is kept unchanged or decreased at 416.

This written description uses examples to disclose the invention, include the best mode, and also to enable a person skilled in the art to make and use the invention. The patentable scope of the invention may include other examples that occur to those skilled in the art.

For example, systems and methods disclosed herein may be implemented using a processor which may include any hardware device for processing data, such as a data processor, central processing unit, an integrated circuit or other chip, an application-specific integrated circuit, a field programmable gate array, hard-wired circuit components, or other devices for processing data. In another example, a dynamic performance adjustment system described herein may be assigned a highest priority for power management and performance control during media playing. In yet another example, in a multiple-application system, static tests may be performed to obtain a minimum performance threshold so that the system performance will not decrease below such a minimum performance threshold under the control of a dynamic performance adjustment system described herein so that other applications may not be negatively affected. In yet another example, systems and methods disclosed herein may be adapted for different power saving schemes to balance power saving and quality of media output.

It is claimed:

1. A method for dynamically adjusting a processing speed of a pipeline, wherein the pipeline includes components that are synchronized for processing media, the method comprising:
    determining a speed at which the pipeline processes the media, wherein the speed is a measure of frames per unit time;
    determining if the speed exceeds or is lower than a predetermined threshold set for a target pipeline performance level;
    selecting, from among the components of the pipeline, one or more of the components that is the most power consuming or that is causing a bottleneck in the speed at which the pipeline processes the media;
    if the speed at which the pipeline processes the media exceeds the predetermined threshold, then decreasing a component performance level of the one or more of the selected components to decrease the speed at which the pipeline processes the media; and
    if the speed at which the pipeline processes the media is lower than the predetermined threshold but the component performance level of the one or more of the selected components is high enough to support the target pipeline performance level, then increasing the component performance level of the one or more of the selected components to increase the speed at which the pipeline processes the media.

2. The method of claim 1, wherein the one or more of the selected components is the most power consuming components from among the components of the pipeline.

3. The method of claim 1, wherein the one or more of the selected components is causing the bottleneck.

4. The method of claim 1, wherein at least one of the components includes a source reader, a demuxer, a video decoder, a video convertor, a video rendering component, an audio decoder, an audio convertor, or an audio renderer.

5. The method of claim 1, further comprising:
    assigning to a portion of the media being processed, a time stamp representing an expected time of arrival at which the portion is expected to arrive at a rendering device; and
    assigning, to the portion of the media, when the portion arrives at the rendering device, a current time indicating when the portion of the media actually arrived at the rendering device;
    wherein the determining of the speed at which the pipeline processes the media is based on a difference between the current time and the expected time of arrival.

6. A system comprising:
    a pipeline that includes components synchronized for processing media; and dynamic performance adjustment hardware configured to:
determine a speed at which the pipeline processes the media, wherein the speed is a measure of frames per unit time;
determine if the speed exceeds or is lower than a predetermined threshold set for a target pipeline performance level;
select, from among the components, one or more of the components that is the most power consuming or that is causing a bottleneck in the speed at which the pipeline processes the media;
if the speed at which the pipeline processes the media exceeds the predetermined threshold, then decrease a component performance level of the one or more of the selected components to decrease the speed at which the pipeline processes the media; and
if the speed at which the pipeline processes the media is lower than the predetermined threshold but the component performance level of the one or more of the selected components is high enough to support the target pipeline performance level, then increase the component performance level of the one or more of the components to increase the speed at which the pipeline processes the media.

7. The system of claim 6, wherein the one or more of the selected components is the most power consuming components from among the components of the pipeline.

8. The system of claim 6, wherein the one or more of the selected components is causing the bottleneck.

9. The system of claim 6, wherein at least one of the components includes a source reader, a demuxer, a video decoder, a video convertor, a video rendering component, an audio decoder, an audio convertor, or an audio renderer.

10. The system of claim 6, wherein the dynamic performance adjustment hardware is further configured to:
assign, to a portion of the media being processed, a time stamp representing an expected time of arrival at which the portion is expected to arrive at a rendering device; and
assign, to the portion of the media, when the portion arrives at the rendering device, a current time indicating when the portion of the media actually arrived at the rendering device;
wherein the determining of the speed at which the pipeline processes the media is based on a difference between the current time and the expected time of arrival.

11. A non-transitory processor-readable storage medium comprising programming instructions for dynamically adjusting a processing speed of a pipeline, wherein the pipeline includes components that are synchronized for processing media, the programming instructions being configured to be executed by a processor to:
determine a speed at which the pipeline processes the media, wherein the speed is a measure of frames per unit time;
determine if the speed exceeds or is lower than a predetermined threshold set for a target pipeline performance level;
select, from among the components of the pipeline, one or more of the components that is the most power consuming or that is causing a bottleneck in the speed at which the pipeline processes the media;
if the speed at which the pipeline processes the media exceeds the predetermined threshold, then decrease a component performance level of the one or more of the selected components to decrease the speed at which the pipeline processes the media; and
if the speed at which the pipeline processes the media is lower than the predetermined threshold but the component performance level of the one or more of the selected components is high enough to support the target pipeline performance level, then increase the component performance level of the one or more of the components to increase the speed at which the pipeline processes the media.

12. The processor-readable storage medium of claim 11, wherein the one or more of the selected components is the most power consuming components from among the components of the pipeline.

13. The processor-readable storage medium of claim 11, wherein the one or more of the selected components is causing the bottleneck.

14. The method of claim 11, wherein at least one of the components includes a source reader, a demuxer, a video decoder, a video convertor, a video rendering component, an audio decoder, an audio convertor, or an audio renderer.

15. The processor-readable storage medium of claim 11, wherein the instructions are further configured to:
assign, to a portion of the media being processed, a time stamp representing an expected time of arrival at which the portion is expected to arrive at a rendering device; and
assigning, to the portion of the media, when the portion arrives at the rendering device, a current time indicating when the portion of the media actually arrived at the rendering device;
wherein the determining of the speed at which the pipeline processes the media is based on a difference between the current time and the expected time of arrival.

* * * * *